Nov. 12, 1935.   R. O. HARPER   2,020,357
LIFT FOR RAISING MOTOR VEHICLES AND SUCH
LIKE FOR INSPECTION OR OTHER PURPOSES
Filed Dec. 29, 1934   3 Sheets-Sheet 1
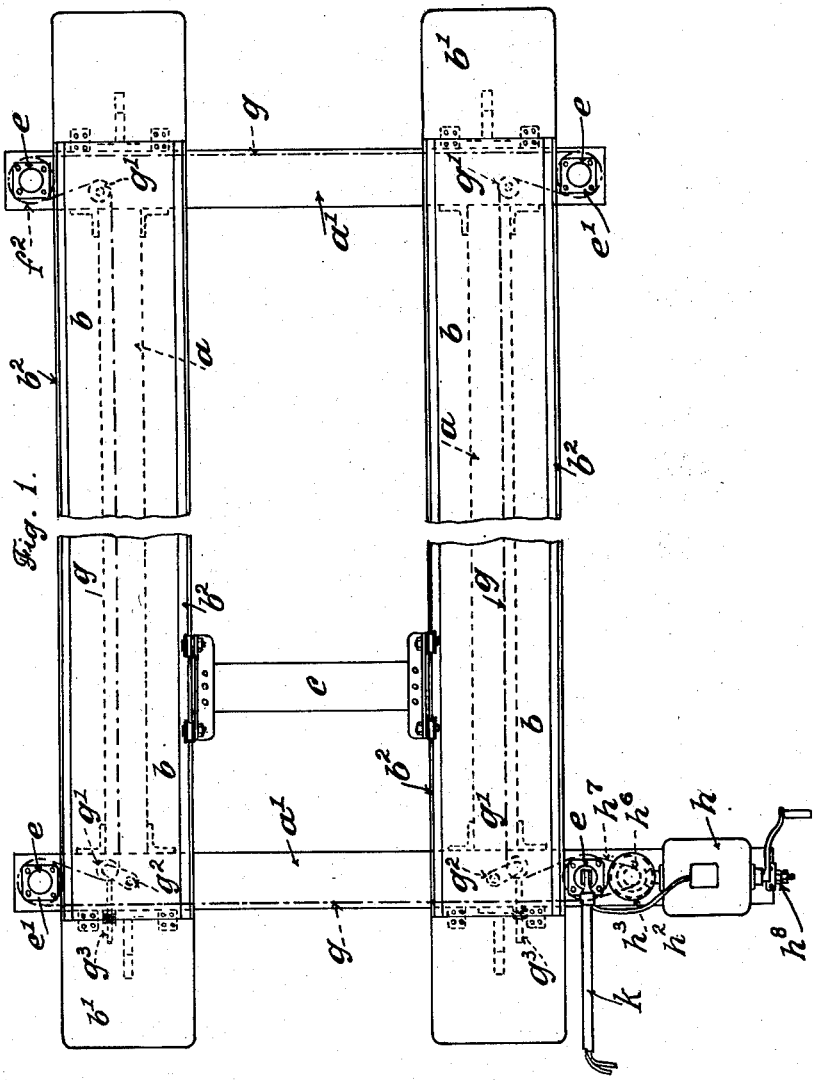
INVENTOR:
ROBERT OWEN HARPER
BY: Francis E. Boyce
ATTORNEY

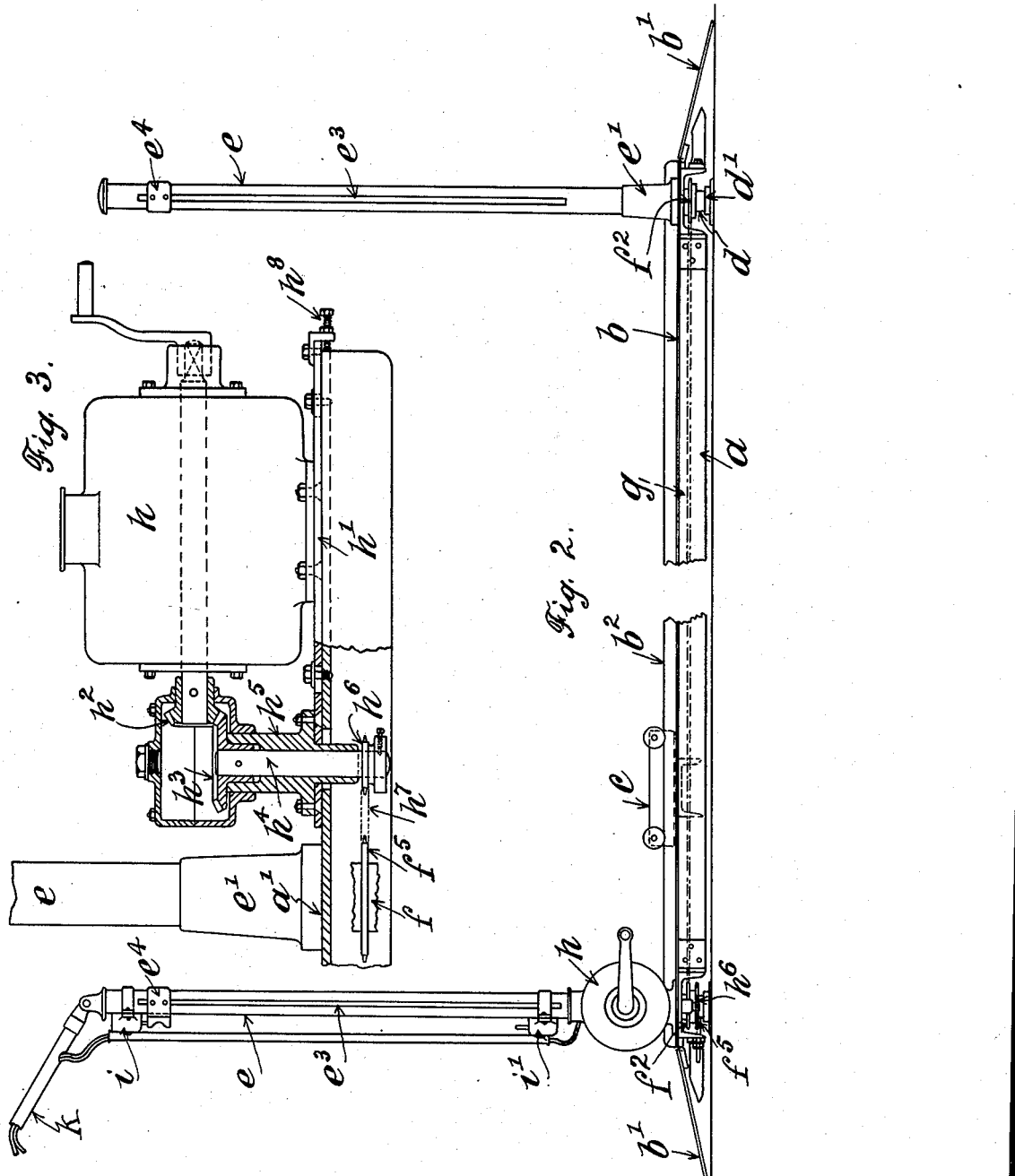

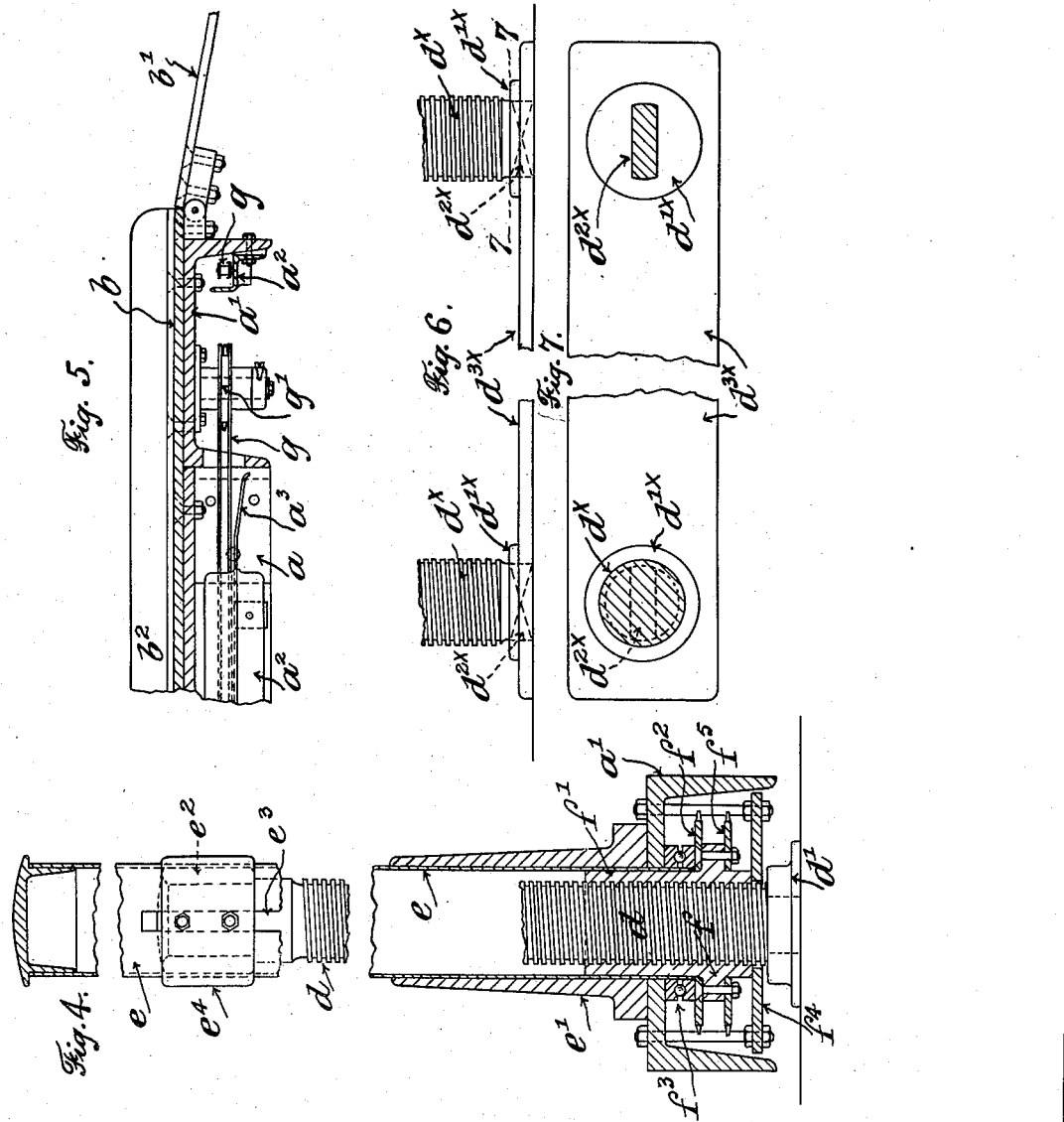

Patented Nov. 12, 1935

2,020,357

UNITED STATES PATENT OFFICE 2,020,357

LIFT FOR RAISING MOTOR VEHICLES AND SUCH LIKE FOR INSPECTION OR OTHER PURPOSES

Robert Owen Harper, Manchester, England

Application December 29, 1934, Serial No. 759,607
In Great Britain January 4, 1934

5 Claims. (Cl. 254—92)

This invention concerns lifts for raising vehicles clear of the ground or floor for the purpose of making inspections, adjustments, or repairs, and relates especially to such lifts for use in garages and such like places for dealing with motor road vehicles.

Apparatus for raising and lowering motor vehicles for repair purposes is known of a transportable nature comprising a surrounding framework or chassis with upright erections and a vertically movable ramp structure, said ramp structure being elevated by revolving screwed shafts operating nuts guided in the upright erection, the screwed shafts being rotated through gear from a motor, and having limit switches to automatically control raising and lowering of the ramp.

My improvements are distinguished by this, that there are provided four corner uprights or columns (or it might be more) and complementary telescopic or vertically slidable elements which rise by vertical thrust reaction on the complementary elements and fall with a telescopic action of the co-acting elements, the movable telescopic elements sustaining and guiding the platform or ramp structure, said platform or ramp structure carrying and housing all the gear which governs the uniform raising and lowering actuation of said platform or ramp structure at all four corners, such gear rising and falling with said platform or ramp structure, and whereby on elevation of said platform or ramp structure no obstructions of any kind exist at the ends or sides save the four telescopic uprights, all whereby there is no obstruction above or below the platform or ramp structure in any position, but the four telescopic corner elements.

This distinguishing and important practical feature is present in the constructions which are now to be described with reference to the accompanying drawings.

In said drawings:—

Fig. 1 shows a plan view of one construction of apparatus having screw-threaded uprights about which the platform or ramp structure is raised and lowered by revolving nut elements driven from an electric motor.

Fig. 2 is a side elevation showing the lift in its lowered position.

Fig. 3 is an enlarged detail view partly in section of the motor shown in Figs. 1 and 2, and the means for transmitting the drive to the lift raising and lowering mechanism.

Fig. 4 is an enlarged elevation, mainly in section, showing the screw-threaded upright with its operative mechanism to which the motor is connected.

Fig. 5 is an enlarged sectional elevation of one end of one of the ramps and the adjacent parts, illustrating the manner of housing and supporting the main driving chain.

Fig. 6 is an enlarged elevation of the lower extremities of two of the screw-threaded uprights, showing a modified arrangement for preventing the screws from turning.

Fig. 7 is a plan view of Fig. 6, the right-hand screw-threaded upright being sectioned on the line 7—7 in Fig. 6.

Referring first to the construction shown in Figs. 1 to 7, the platform or ramp structure which moves vertically consists of a rectangular metal framework built-up of two longitudinal members $a$ joined at each end by a cross-member $a'$, all these members being conveniently of inverted channel section as shown. The longitudinal members $a$ support full length ramps or run-ways $b$ upon which the wheels of the vehicle may rest, and these ramps $b$ are so spaced apart and are of sufficient width to accommodate the varying tracks of different vehicles. Hinged flaps $b'$ are provided at one or both ends of the ramps $b$ to enable vehicles to be run up on to the ramps when the lift is in the lowered position, as shown in Fig. 2. The ramps $b$ are strengthened along their longitudinal edges with strips of angle iron $b2$, the two inner strips also serving as rails to carry one or more removable wheeled carriages such as $c$ for supporting jacks or for other purposes.

The ends of the cross-members $a'$ project a short distance beyond the longitudinal members $a$ as shown in Fig. 1, and through each of these projecting portions passes a vertically disposed screw or screw-threaded upright $d$, four of these being shown in the drawings—one at each corner of the ramp structure. A vertical sleeve $e$ houses each screw $d$ when the lift is in the lowered position, said sleeve having its lower extremity projecting through the cross-member $a'$ and being mounted upon such cross-member by means of a short flanged sleeve $e'$ sweated or otherwise fixed around the sleeve $e$ and bolted upon the cross-member $a'$ (see Fig. 4). An inner collar $e2$ fixed on the top of each screw $d$ fits slidably in the surrounding sleeve $e$ to provide a bearing for the said screw and keep the same concentric with the sleeve $e$, and this collar has a projection which passes through a long vertical slot $e3$ in the sleeve $e$ and so prevents the screw $d$ from rotating, whilst allowing relative vertical movement between the same and the ramp structure. An outer collar $e4$ slidable around the sleeve $e$ is bolted to the projection on the inner collar $e2$. The object of this outer collar $e4$ is to embrace the sleeve $e$ and so prevent distortion of the same and the vertical slot $e3$ when restraining the screw $d$ from rotating.

Referring now to any one of the four screws $d$, such as that shown in Fig. 4, the screw thread extends over practically the whole length and the lower extremity rests in a foot $d'$ upon the floor. A flanged nut $f$ engages with this screw-thread, the elongated boss $f'$ of such nut finding a bearing in the lower part of the vertical sleeve $e$, and a chain wheel $f2$ is fixed to the upper face of the flange on the nut $f$. Above the chain wheel $f2$ and surrounding the boss $f'$ of the nut is a ball thrust bearing $f3$ which supports above it the projecting end of the cross-member $a'$, the arrangement being such that as the nut $f$ is rotated in one direction by the chain wheel, it moves up the screw $d$ and carries with it the supported cross-member $a'$. A retaining plate $f4$ is fixed to the cross-member $a'$ below the nut $f$ to prevent the nut from leaving the thrust bearing $f3$ during lowering of the lift should the weight of the ramp structure be taken off the nuts. It is clear from Fig. 4 that the screw $d$ passes through the centre of the retaining plate $f4$, nut $f$, chain wheel $f2$ and thrust bearing $f3$, and when the lift is in its lowest position (see Fig. 2) the whole of the screw $d$ is enclosed and housed within the vertical sleeve $e$ and the parts above the retaining plate $f4$. The top of the vertical sleeve $e$ is shown in Fig. 4 as being closed by a dust cap and serves for the introduction of lubricant to the screw and nut.

The nuts $f$ are rotated by an endless main driving chain $g$ passing around each of the four chain wheels $f2$ and also around four guiding jockey sprockets $g'$, two of these sprockets being mounted on swinging brackets $g2$ having adjusting means $g3$ for tightening the chain (see Fig. 1). The main chain $g$ is thus disposed entirely beneath the members $a$ and $a'$ of the ramp structure and it is further masked by metal strips $a2$ with end lips $a3$ applied to said members, these metal strips $a2$ also forming ledges to support the chain when slack, as clearly shown in Fig. 5.

One of the cross-members $a'$ of the ramp structure has an extension at one end to support the mechanism which drives the endless main chain $g$. This mechanism, as shown in Figs. 1, 2 and 3, comprises a horizontally disposed electric motor $h$ fixed upon a bed-plate $h'$ and connected through bevel gearing $h2$, $h3$ to a vertical shaft $h4$ supported in bearings $h5$ fixed to the bed-plate $h'$, said vertical shaft $h4$ passing down through a slot in the extended cross-member $a'$ and carrying at its lower end a chain wheel $h6$ which drives through a short chain $h7$ a second chain wheel $f5$ fixed to the lower face of the flange on the nut $f$ of the adjacent screw $d$. Thus the drive from the motor $h$ is transmitted in positive fashion to the main chain $g$ and so to the nuts $f$ which can be rotated in unison to raise or lower the entire ramp structure at a suitable speed which is governed by the sizes of chain and gear wheels used.

The bed-plate $h'$ is attached to the extended cross-member $a'$ by bolts passing through slots, and an adjusting device $h8$ is provided to enable the whole bed-plate and its supported mechanism to be moved for the purpose of taking-up slack in the short chain $h7$.

Limit switches are preferably incorporated in the electrical conections to the motor $h$ to limit the upward and downward movements of the lift as well known in connection with ordinary lifts for buildings. In the arrangement illustrated in Figs. 1 and 2, an upper and a lower limit switch $i$, $i'$ are fixed upon the vertical sleeve $e$ which is adjacent to the motor $h$ and are adapted to be actuated by a projection on the collar $e4$. The wires conducting current to the limit switches and motor are shown as being supported by a rigid carrier $k$ pivotally connected at one end to the top of the vertical sleeve $e$, the other end (not shown) being flexibly connected to any convenient part of the premises where the lift is installed, thus allowing for the movement of the vertical sleeve $e$ and lift platform whilst keeping the wires out of the way of the operators. A hand switch would also be provided for stopping, raising and lowering the lift at will.

In a modified form of drive transmission between the motor and the first nut, the motor is mounted vertically and drives the intermediate vertical shaft by means of a primary chain and chain wheels arranged to provide the necessary speed reduction, the positions of the motor and intermediate vertical shaft being separately adjustable to tighten the chains, such a chain drive being generally known.

In a further modification, a vertically mounted motor drives through a mechanical reversing gear an intermediate vertical shaft which in turn drives the first nut through a chain and chain wheels as before, and in this case the operation of the reversing gear and electric switches may be effected by a single control wheel, as is known. When the control wheel is in the central position, current is switched off and the gear in neutral; movement (say) to the right first starts the motor, then further movement in that direction engages one gear to lower the lift, whilst return movement of the control wheel first disengages the "lowering" gear and then switches off the current to stop the motor; corresponding movement of the control wheel in the other direction controls the raising of the lift. The limit switches previously mentioned may also be used if desired. In all cases a handle may be provided for manually rotating the motor in the event of failure of current as is well known.

In the modified arrangement for preventing rotation of the screws or screw-threaded uprights shown in Figs. 6 and 7, the lower extremities of the screws $d^x$ have each a tongue or projection $d^{2x}$ adapted to fit a correspondingly shaped recess in its foot $d^{1x}$, and the feet are connected in pairs by metal strips $d^{3x}$, so that each foot in a pair resists the tendency of the other foot and its screw to rotate. With this arrangement, the slot $e3$ and collar $e4$ are unnecessary and the plungers or levers of the limit switches would project through short slots in the sleeve $e$ and be operated by the inner collar $e2$ on the screw $d$.

With the construction of lift described above, the nuts and chains are completely housed inside the channels of the members forming the ramp structure, so retaining lubricant and guarding the operator from danger. Moreover, should the supply of electric current fail or the driving chains or other part of the transmission break, the lift is automatically held by the nuts since these can only move down the screws when rotated by an applied force.

I declare that what I claim is:—

1. An apparatus for raising and lowering motor vehicles for repair purposes comprising telescopic elements movable vertically upon upright support elements, and sustaining and guiding a ramp structure which carries means for governing the uniform raising and lowering of said ramp structure, means conveying motive power to the apparatus to actuate said telescopic elements, and a rigid carrier supporting said second means out of the way of an operator, said carrier being flexibly connected at one end to a point near the top of one of the movable telescopic elements and flexibly connected at the other end to a wall of the building in which the apparatus is installed.

2. An apparatus for raising and lowering motor vehicles for repair purposes comprising stationary screw-threaded uprights, complementary telescopic upright elements movable vertically with respect thereto, a ramp structure sustained around its outer edges by said telescopic elements and guided thereby, revolvable nuts engaging said stationary screw-threaded uprights and supporting the ramp structure and telescopic elements, chain wheels operatively connected to said nuts, a chain interconnecting said chain wheels and housed in the ramp structure, an electric motor mounted on said ramp structure and connected to said chain for rotating said nuts to raise and lower the telescopic elements and the sustained ramp structure, and a rigid carrier supporting the wires conveying current to the motor and flexibly connected to the top of one of the movable telescopic elements and to the wall of the building in which the apparatus is installed.

3. An apparatus for raising and lowering motor vehicles for repair purposes comprising stationary screw-threaded uprights, complementary telescopic upright elements movable vertically with respect thereto, a ramp structure sustained and guided around its outer edges by said telescopic elements, revolvable nuts engaging said stationary screw-threaded uprights and supporting the ramp structure and telescopic elements, chain wheels operatively connected to said nuts, a chain interconnecting said chain wheels, and housed in the ramp structure, an electric motor mounted on said ramp structure and connected to said chain for rotating said nuts to raise and lower the telescopic elements and the sustained ramp structure, a rigid carrier supporting the wires conveying current to the motor and flexibly connected to the top of one of the movable telescopic elements and to the wall of the building in which the apparatus is installed, and limit switches mounted on one of the movable telescopic elements and operable by an actuating device fixed on the corresponding stationary screw-threaded upright to automatically limit the extent of the raising and lowering movement of the ramp structure.

4. A portable lift for raising and lowering motor vehicles for inspection and repair comprising stationary screw-threaded uprights, vertical sleeves telescopically fitting over said uprights and guiding same, a ramp structure comprising lateral and longitudinal frame members, said longitudinal frame members supporting ramp rails, and said transverse frame members having secured near their ends said vertical sleeves with the lower ends of said sleeves projecting through said lateral frame members, revolvable nuts engaging said stationary screw-threaded uprights and supporting said ramp structure through an interposed bearing, said nuts having extended bosses fitting rotatably within the lower ends of said vertical sleeves, motor means carried by and movable with said ramp structure, and gearing housed in said ramp structure and connecting the revolvable nuts with said motor means.

5. A portable lift for raising and lowering motor vehicles for inspection and repair comprising stationary screw-threaded uprights, vertical sleeves telescopically fitting over said upright and guiding same, a ramp structure comprising lateral and longitudinal frame members, said longitudinal frame members supporting ramp rails and said lateral frame members having secured near their ends said vertical sleeves, revolvable nuts engaging said screw-threaded uprights and supporting the ramp structure and vertical sleeves, motor means carried by and movable with said ramp structure, gearing housed in said ramp structure and connecting the revolvable nuts with said motor means, and means to hold said screw-threaded uprights against rotation comprising thin floor plates extending between said uprights with shaped apertures near their ends and interlocking projections on the base of said uprights engaging said shaped apertures.

ROBERT OWEN HARPER.